(12) United States Patent
Hayashi

(10) Patent No.: US 8,985,139 B2
(45) Date of Patent: Mar. 24, 2015

(54) CARBON DIOXIDE SUPPLY SYSTEM

(75) Inventor: Ryutaro Hayashi, Osaka (JP)

(73) Assignee: Plasteco Corporation, Osaka (JP)

( * ) Notice: Subject to any disclaimer, the term of this patent is extended or adjusted under 35 U.S.C. 154(b) by 911 days.

(21) Appl. No.: 12/998,311

(22) PCT Filed: Oct. 6, 2009

(86) PCT No.: PCT/JP2009/005186
§ 371 (c)(1),
(2), (4) Date: Jun. 29, 2011

(87) PCT Pub. No.: WO2010/041427
PCT Pub. Date: Apr. 15, 2010

(65) Prior Publication Data
US 2011/0315243 A1    Dec. 29, 2011

Related U.S. Application Data

(60) Provisional application No. 61/103,541, filed on Oct. 7, 2008.

(51) Int. Cl.
*F16K 17/38*    (2006.01)
*B29C 44/34*    (2006.01)
*F17C 9/00*     (2006.01)

(52) U.S. Cl.
CPC ........... *B29C 44/348* (2013.01); *B29C 44/3446* (2013.01); *F17C 9/00* (2013.01); *F17C 2201/0109* (2013.01); *F17C 2201/0119* (2013.01); *F17C 2205/0323* (2013.01); *F17C 2205/0332* (2013.01); *F17C 2205/0335* (2013.01);

(Continued)

(58) Field of Classification Search
CPC .... F17C 13/026; F16K 17/042; F15B 21/045; F15B 21/042; B29C 44/00
USPC ............... 137/468, 334, 551, 561 R, 565.01, 137/565.15
See application file for complete search history.

(56) References Cited

U.S. PATENT DOCUMENTS 5,062,446 A * 11/1991 Anderson ...................... 137/468
5,108,264 A    4/1992 Abdel-Rahman

FOREIGN PATENT DOCUMENTS

JP    04-234578    8/1992
JP    06-147102    5/1994

(Continued)

OTHER PUBLICATIONS

Translation of JP2005-125767.*

*Primary Examiner* — Kevin Lee
*Assistant Examiner* — P. Macade Nichols
(74) *Attorney, Agent, or Firm* — Jean C. Edwards, Esq; Edwards Neils PLLC

(57) ABSTRACT

The carbon dioxide supply system includes: a reservoir reserving carbon dioxide; a pump arranged on a downstream side of the reservoir in a supply direction for the carbon dioxide for feeding the carbon dioxide with pressure while suppressing pulsation; a first pipe connecting the reservoir and the pump with each other; a second pipe connected to the downstream side of the pump in the supply direction and having no pulsation buffering device buffering pulsation of the pump; and a cooling apparatus interposed at least in an intermediate portion of the first pipe.

3 Claims, 1 Drawing Sheet

(52) U.S. Cl.
CPC ... *F17C 2221/013* (2013.01); *F17C 2223/0153* (2013.01); *F17C 2223/035* (2013.01); *F17C 2225/0115* (2013.01); *F17C 2225/0153* (2013.01); *F17C 2225/033* (2013.01); *F17C 2225/036* (2013.01); *F17C 2227/0135* (2013.01); *F17C 2227/0302* (2013.01); *F17C 2227/0337* (2013.01); *F17C 2227/0388* (2013.01); *F17C 2250/032* (2013.01); *F17C 2250/043* (2013.01); *F17C 2250/0439* (2013.01); *F17C 2250/0495* (2013.01); *F17C 2260/02* (2013.01); *F17C 2270/05* (2013.01)
USPC ............... 137/468; 137/334; 137/561 R

(56) References Cited

FOREIGN PATENT DOCUMENTS

| JP | 2000-218647 | 8/2000 |
| JP | 2004-044650 | 2/2004 |
| JP | 2005-125767 | 5/2005 |
| JP | 2005225141 A | 8/2005 |

* cited by examiner

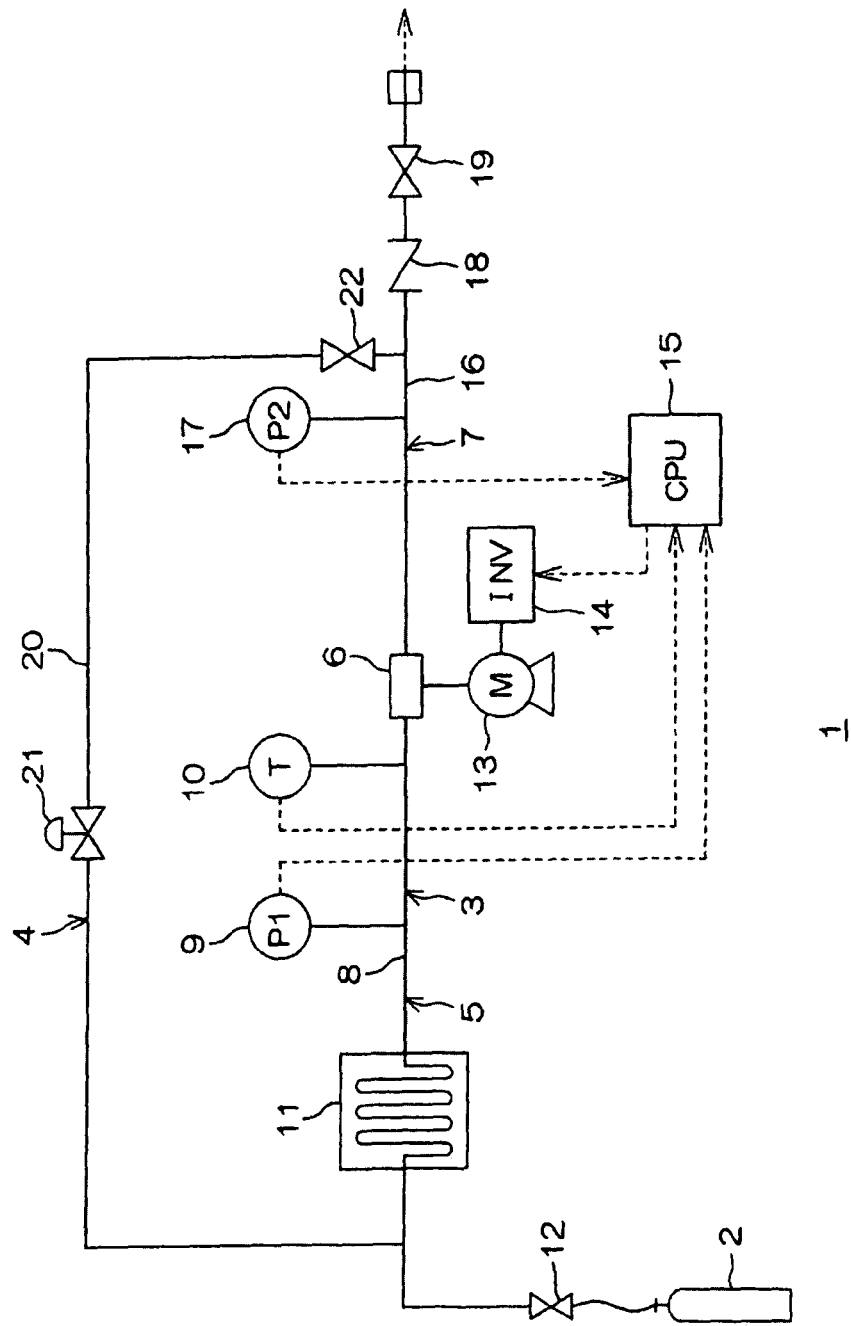

CARBON DIOXIDE SUPPLY SYSTEM

CROSS-REFERENCE TO RELATED APPLICATIONS

The present invention is a 35 U.S.C. 371 National Stage Entry of PCT/JP2009/005186, filed Oct. 6, 2009, which claims priority from U.S. Provisional Patent Application No. 61/103,541, filed on Oct. 7, 2008, the contents of which are all herein incorporated by reference.

TECHNICAL FIELD

The present invention relates to a carbon dioxide supply system supplying carbon dioxide.

PRIOR ART

In foam molding of resin, carbon dioxide gas may be employed as a foaming agent. In this case, it is necessary to quantitatively supply carbon dioxide gas to a molding machine, in order for uniformly mixing the carbon dioxide gas into resin.

As an apparatus quantitatively supplying carbon dioxide gas, a quantitative supplying apparatus including a pump and a buffer tank arranged on a downstream side of the pump in a gas passage introducing carbon dioxide gas from a gas supply source into a resin foam molding machine is proposed, for example (refer to the following Patent Document 1, for example).

The quantitative supplying apparatus prevents pulsation in supply of the carbon dioxide gas by temporarily reserving the carbon dioxide gas fed by the pump with pressure in the buffer tank and thereafter feeding the carbon dioxide gas from the buffer tank to the resin foam molding machine.

PRIOR ART

Patent Document

Patent Document 1: Japanese Unexamined Patent Publication No. 2004-44650

DISCLOSURE OF THE INVENTION

Problems to be Solved by the Invention

In the quantitative supplying apparatus described in the aforementioned Patent Document 1, however, the carbon dioxide gas is supplied from the buffer tank with higher pressure to the resin foam molding machine with lower pressure, due to the pressure difference between the buffer tank and the resin foam molding machine.

In the resin foam molding machine, on the other hand, the pressure may partially fluctuate (the pressure becomes non-uniform) when mixing the supplied carbon dioxide into resin, due to flowage of the resin and the carbon dioxide gas.

If pressure fluctuation takes place in the resin foam molding machine, the pressure difference between the buffer tank and the resin foam molding machine also fluctuates due to the pressure fluctuation, and the quantity of the carbon dioxide gas supplied from the buffer tank to the resin foam molding machine disadvantageously fluctuates.

Accordingly, an object of the present invention is to provide a carbon dioxide supply system capable of quantitatively supplying carbon dioxide regardless of pressure fluctuation in an object supplied with the carbon dioxide.

Solutions to the Problems

The present invention provides a carbon dioxide supply system for supplying carbon dioxide, including: a reservoir reserving the carbon dioxide; a pump arranged on a downstream side of the reservoir in a supply direction for the carbon dioxide for feeding the carbon dioxide with pressure while suppressing pulsation; a first pipe connecting the reservoir and the pump with each other; a second pipe connected to the downstream side of the pump in the supply direction and having no pulsation buffering means for buffering pulsation of the pump; and a cooling apparatus interposed at least in an intermediate portion of the first pipe.

According to this structure, since the carbon dioxide supply system includes the second pipe having no pulsation buffering means for buffering pulsation of the pump, no pressure difference takes place between the object and the pulsation buffering means, and the quantity of the supplied carbon dioxide can be prevented from fluctuation when pressure fluctuates in an object supplied with the carbon dioxide.

Further, the carbon dioxide supply system includes the pump feeding the carbon dioxide with pressure while suppressing pulsation. Therefore, pulsation can be suppressed by the pump, and fluctuation of the quantity of the supplied carbon dioxide due to pulsation can be prevented.

Consequently, the carbon dioxide can be quantitatively supplied, regardless of pressure fluctuation in the object.

Preferably, the carbon dioxide supply system according to the present invention includes: a thermometer measuring the temperature of the carbon dioxide flowing in the first pipe; a first pressure gauge measuring the pressure in the first pipe; and a control means controlling operation of the pump on the basis of the results of the measurements by the thermometer and the first pressure gauge.

According to this structure, the state of the carbon dioxide on a primary side flowing into the pump can be monitored through the results of the measurements by the thermometer and the first pressure gauge.

When controlling the operation of the pump on the basis of the results of the measurements by the thermometer and the first pressure gauge, the quantity of the supplied carbon dioxide can be controlled to a constant level in a simple structure.

Preferably, the carbon dioxide supply system according to the present invention includes a second pressure gauge measuring the pressure in the second pipe, and the control means controls the operation of the pump on the basis of the results of the measurements by the thermometer, the first pressure gauge and the second pressure gauge.

According to this structure, the state of the carbon dioxide on the primary side flowing into the pump can be estimated through the results of the measurements by the thermometer and the first pressure gauge, while the pressure-feeding state of the pump can be monitored by measuring the pressure on the primary side and the pressure on a secondary side where the carbon dioxide flows out of the pump with the first pressure gauge and the second pressure gauge.

When controlling the operation of the pump on the basis of the results of the measurements by the thermometer, the first pressure gauge and the second pressure gauge, therefore, the quantity of the supplied carbon dioxide can be controlled to a more constant level in a simple structure.

Preferably, the carbon dioxide supply system according to the present invention includes: a third pipe connected to the first pipe and the second pipe for refluxing the carbon dioxide fed by the pump with pressure from the second pipe to the first pipe when stopping the supply of the carbon dioxide.

According to this structure, the supply of the carbon dioxide can be stopped by simply refluxing the carbon dioxide fed by the pump with pressure from the second pipe to the first pipe without stopping the entire carbon dioxide supply system.

Therefore, the supply of the carbon dioxide and the stoppage of the supply of the carbon dioxide can be easily switched.

Effect of the Invention

According to the inventive carbon dioxide supply system, the carbon dioxide can be quantitatively supplied regardless of pressure fluctuation in the object.

BRIEF DESCRIPTION OF THE DRAWINGS

The FIGURE is a schematic block diagram showing an embodiment of the carbon dioxide supply system according to the present invention.

EMBODIMENT OF THE INVENTION

The FIGURE is a schematic block diagram showing an embodiment of the carbon dioxide supply system according to the present invention.

A carbon dioxide supply system 1 includes a carbon dioxide tank 2 as an example of the reservoir, a carbon dioxide supply portion 3 for supplying carbon dioxide in the carbon dioxide tank 2, and a carbon dioxide reflux portion 4, as shown in the FIGURE.

The carbon dioxide tank 2 is a cylinder for reserving carbon dioxide, and filled therein with liquid carbon dioxide.

The carbon dioxide supply portion 3 includes a primary-side supply portion 5, a pump 6 and a secondary-side supply portion 7.

The primary-side supply portion 5 is arranged on a downstream side of the carbon dioxide tank 2 in a supply direction for the carbon dioxide (the downstream side and an upstream side are based on the supply direction for the carbon dioxide, unless otherwise stated), and connected to the carbon dioxide tank 2. The primary-side supply portion 5 feeds the carbon dioxide stored in the carbon dioxide tank 2 into the pump 6. In other words, the primary-side supply portion 5 is provided on a side (a primary side) for introducing the carbon dioxide into the pump 6. Further, the primary-side supply portion 5 includes a first supply line 8 as an example of the first pipe, a primary-side pressure gauge 9 as an example of the first pressure gauge, a thermometer 10 and a chiller 11 as an example of the cooling apparatus.

The first supply line 8 is formed as a pipe of metal, and a first end portion (an upstream-side end portion) thereof is connected to the carbon dioxide tank 2. A first on-off valve 12 is provided on the first end portion of the first supply line 8.

The first on-off valve 12 is moved to an open position or a closed position, to allow passage of the carbon dioxide from the carbon dioxide tank 2 to the first supply line 8 on the open position, or to block the passage of the carbon dioxide from the carbon dioxide tank 2 to the first supply line 8 on the closed position.

The primary-side pressure gauge 9 is provided on an intermediate portion of the first supply line 8 (in the vicinity of the pump 6), to measure the pressure in the first supply line 8 on the primary side. Further, the primary-side pressure gauge 9 is connected to a CPU 15 (described later), to input the measured value in the CPU 15 (described later).

The thermometer 10 is provided on the downstream side of the primary-side pressure gauge 9 in the first supply line 8, to measure the temperature of the carbon dioxide flowing in the first supply line 8. Further, the thermometer 10 is connected to the CPU 15 (described later), to input the measured value in the CPU 15 (described later).

The chiller 11 is provided on an intermediate portion of the first supply line 8 between the first on-off valve 12 and the primary-side pressure gauge 9, and cools the carbon dioxide flowing in the first supply line 8 to a constant temperature, to keep the same in the liquid state.

The pump 6 is arranged on the downstream side of the primary-side supply portion 5, and connected to a second end portion (a downstream-side end portion) of the first supply line 8. The pump 6 feeds the carbon dioxide with pressure while suppressing pulsation. The pump 6 can be prepared from a multiple non-pulsating pump described in Japanese Unexamined Patent Publication No. 6-147102, for example.

A motor 13 for driving the pump 6, an inverter 14 for supplying power to the motor 13, and the CPU 15 as an example of the control means controlling driving of the motor 13 through the inverter 14 are connected to the pump 6.

The secondary-side supply portion 7 is arranged on the downstream side of the pump 6, and connected to the pump 6. The secondary-side supply portion 7 supplies the carbon dioxide discharged from the pump 6 to an object such as a molding machine, for example, supplied with the carbon dioxide. In other words, the secondary-side supply portion 7 is provided on a side (a secondary side) where the carbon dioxide is discharged from the pump 6. The secondary-side supply portion 7 includes a second supply line 16 as an example of the second pipe and a secondary-side pressure gauge 17 as an example of the second pressure gauge.

The second supply line 16 is formed as a pipe of metal, and a first end portion (an upstream-side end portion) thereof is connected to the pump 6. A check valve 18 and a second on-off valve 19 are provided on a second end portion of the second supply line 16.

The check valve 18 prevents the carbon dioxide from flowing back from the object supplied with the carbon dioxide to the second supply line 16 when supplying the carbon dioxide from the second supply line 16 to the object.

The second on-off valve 19 is provided to be movable to an open position or a closed position on the downstream side of the check valve 18, to allow passage of the carbon dioxide from the second supply line 16 to the object on the open position, or to block the passage of the carbon dioxide from the second supply line 16 to the object on the closed position.

The second supply line 16 has no pulsation buffering means for buffering pulsation of the pump 6. The pulsation buffering means can be formed by a buffer tank or the like temporarily reserving carbon dioxide fed by a pump with pressure, for example.

The secondary-side pressure gauge 17 is provided on an intermediate portion of the secondary-side supply line 16 between the pump 6 and the check valve 18, to measure the pressure in the second supply line 16 on the secondary side. Further, the secondary-side pressure gauge 17 is connected to the CPU 15, to input the measured value in the CPU 15.

The carbon dioxide reflux portion 4 is connected to the first supply line 8 and the second supply line 16, to reflux the carbon dioxide fed by the pump 6 with pressure from the second supply line 16 to the first supply line 8. The carbon dioxide reflux portion 4 includes a reflux line 20 as an example of the third pipe and a pressure-open valve 21.

The reflux line 20 is formed as a pipe of metal, and a first end portion (an end portion on an upstream side in a reflux direction for the carbon dioxide) thereof is connected to the second supply line 16 between the secondary-side pressure gauge 17 and the check valve 18 while a second end portion (an end portion on a downstream side of the reflux direction for the carbon dioxide) thereof is connected to the first supply line 8 between the first on-off valve 12 and the chiller 11. A third on-off valve 22 is provided on the first end portion of the reflux line 20.

The third on-off valve is provided to be movable to an open position or a closed position, to allow passage of the carbon dioxide from the second supply line 16 to the reflux line 20 on the open position, or to block the passage of the carbon dioxide from the second supply line 16 to the reflux line 20 on the closed position.

The pressure-open valve 21 is provided on an intermediate portion of the reflux line 20 and automatically opened when the pressure in the reflux line 20 exceeds a predetermined level, to control the pressure in the reflux line 20 to be not higher than the predetermined level.

The supply of the carbon dioxide by the carbon dioxide supply system 1 and stoppage of the supply are now described.

When the carbon dioxide supply system 1 supplies the carbon dioxide, the third on-off valve 22 is first arranged on the closed position, while the first on-off valve 12 and the second on-off valve 19 are arranged on the open positions.

Then, power is supplied to the motor 13 from a power source (not shown) through the inverter 14, to drive the pump 6.

Thus, the carbon dioxide in the carbon dioxide tank 2 is introduced into the pump 6 from the carbon dioxide tank 2 through the first supply line 8.

At this time, the carbon dioxide flows in the first supply line 8 in the liquid state and is introduced into the pump 6, while the same is cooled by the chiller 11.

Then, the carbon dioxide fed by the pump 6 with pressure and discharged from the pump 6 is supplied to the object through the second supply line 16 in a state of high pressure (supercritical, for example).

When the carbon dioxide supply system 1 temporarily stops the supply of the carbon dioxide, the first on-off valve 12 is arranged on the open position, while the third on-off valve 22 is arranged on the open position and the second on-off valve 19 is arranged on the closed position in the state driving the pump 6.

Thus, the carbon dioxide discharged from the pump 6 flows from the second supply line 16 into the reflux line 20, and is refluxed to the first supply line 8 through the reflux line 20 on the upstream side of the chiller 11. The refluxed carbon dioxide is introduced into the pump 6, while the same is cooled by the chiller 11 again.

Control of the operation of the pump 6 with the CPU 15 is now described.

In the carbon dioxide supply system 1, the pressure in the first supply line 8 is measured by the primary-side pressure gauge 9 while the temperature of the carbon dioxide introduced into the pump 6 is measured by the thermometer 10 in the primary-side supply portion 5 in which the carbon dioxide is introduced into the pump 6, and the results of the measurements by the primary-side pressure gauge 9 and the thermometer 10 are transmitted to the CPU 15.

Then, the CPU 15 calculates the density of the carbon dioxide in the first supply line 8 (i.e., the density of the carbon dioxide introduced into the pump 6), on the basis of the results of the measurements (i.e., the pressure and the temperature) by the primary-side pressure gauge 9 and the thermometer 10.

In the carbon dioxide supply system 1, further, the pressure in the secondary-side supply line 16 is measured by the secondary-side pressure gauge 17 in the secondary-side supply portion 7 in which the carbon dioxide is discharged from the pump 6, and the result of the measurement is transmitted to the CPU 15.

The CPU 15 controls the inverter 14 and the motor 13 to control the discharge of the pump 6 in response to the target discharge of the pump 6 on the basis of the calculated density of the carbon dioxide, and monitors the pressure-feeding state of the pump 6 to control the operation of the pump 6 on the basis of the results of the measurements by the primary-side pressure gauge 9 and the secondary-side pressure gauge 17.

Thus, the CPU 15 controls the operation of the pump 6 on the basis of the results of the measurements by the thermometer 10, the primary-side pressure gauge 9 and the secondary-side pressure gauge 17.

3. Functions/Effects

The carbon dioxide supply system 1 includes the second supply line 16 having no pulsation buffering means for buffering pulsation of the pump 6, as shown in the FIGURE. Even if pressure fluctuates in the object supplied with the carbon dioxide, therefore, no pressure difference takes place between the object and the pulsation buffering means, and the quantity of the supplied carbon dioxide can be prevented from fluctuation.

Further, the carbon dioxide supply system 1 includes the pump 6 feeding the carbon dioxide with pressure while suppressing pulsation. Thus, pulsation can be suppressed by the pump 6, and fluctuation of the quantity of the supplied carbon dioxide due to pulsation can be prevented.

Consequently, the carbon dioxide can be quantitatively supplied regardless of pressure fluctuation in the object.

According to the carbon dioxide supply system 1, the state of the carbon dioxide on the primary side flowing into the pump 6 can be monitored through the results of the measurements by the thermometer 10 and the primary-side pressure gauge 9.

When controlling the operation of the pump 6 on the basis of the results of the measurements by the thermometer 10 and the primary-side pressure gauge 9, the quantity of the supplied carbon dioxide can be controlled to a constant level in a simple and low-priced structure, without providing a high-priced flowmeter on the secondary-side supply portion 7, for example.

According to the carbon dioxide supply system 1, the state of the carbon dioxide on the primary side flowing into the pump 6 can be monitored through the results of the measurements by the thermometer 10 and the primary-side pressure gauge 9, and the pressure-feeding state of the pump 6 can be monitored by measuring the pressure on the primary side and the pressure on the secondary side where the carbon dioxide flows out of the pump 6 with the primary-side pressure gauge 9 and the secondary-side pressure gauge 17.

When controlling the operation of the pump 6 on the basis of the results of the measurements by the thermometer 10, the primary-side pressure gauge 9 and the secondary-side pressure gauge 17, therefore, the quantity of the supplied carbon dioxide can be controlled to a more constant level in a simple structure.

According to the carbon dioxide supply system 1, the supply of the carbon dioxide can be temporarily stopped by simply refluxing the carbon dioxide fed by the pump 6 with pressure from the second supply line 16 to the first supply line 8 through the reflux line 20 without stopping the entire carbon dioxide supply system 1 when temporarily stopping the supply of the carbon dioxide to the object.

Therefore, the supply of the carbon dioxide and the stoppage of the supply of the carbon dioxide can be easily switched.

In the case of supplying the carbon dioxide to the molding machine in the aforementioned embodiment, a heater (not shown) may be provided between the molding machine to be supplied with the carbon dioxide and the second supply line 16.

Further, the carbon dioxide may be supplied to the molding machine after the same is heated to 30 to 200° C., for example, by the heater (not shown), in order not to reduce the temperature of resin melted at a high temperature (150 to 300° C., for example) in the molding machine. At this time, the carbon dioxide is supplied to the molding machine in a supercritical state, due to pressurization by the pump 6 and the heating by the heater (not shown).

Thus, the temperature of the resin in the molding machine can be kept constant, and stable molding can be implemented.

While the aforementioned invention has been provided as an illustrative embodiment of the present invention, this is merely an illustration, and must not be interpreted as restrictive. Modifications of the present invention obvious to those skilled in the art in the technical field are included in the scope of Claims for patent described later.

INDUSTRIAL APPLICABILITY

The carbon dioxide supply system according to the present invention is utilized as a carbon dioxide supply system for supplying carbon dioxide in foam molding employing the carbon dioxide as a foaming agent.

The invention claimed is:

1. A carbon dioxide supply system for supplying carbon dioxide, comprising:
   a reservoir reserving the carbon dioxide;
   a pump arranged on a downstream side of the reservoir in a supply direction for the carbon dioxide for feeding the carbon dioxide with pressure while suppressing pulsation;
   a first pipe connecting the reservoir and the pump with each other;
   a second pipe connected to the downstream side of the pump in the supply direction and having no pulsation buffering means for buffering pulsation of the pump;
   a third pipe connected to the first pipe and the second pipe for refluxing the carbon dioxide fed by the pump with pressure from the second pipe to the first pipe when stopping the supply of the carbon dioxide;
   an on-off valve provided on an end portion on an upstream side of the third pipe in a reflux direction for the carbon dioxide from the second pipe to the first pipe for blocking the passage of the carbon dioxide from the second pipe to the third pipe when supplying the carbon dioxide; and
   a cooling apparatus interposed at least in an intermediate portion of the first pipe.

2. The carbon dioxide supply system according to claim 1, comprising:
   a thermometer measuring the temperature of the carbon dioxide flowing in the first pipe;
   a first pressure gauge measuring the pressure in the first pipe; and
   a control means controlling operation of the pump on the basis of the results of the measurements by the thermometer and the first pressure gauge.

3. The carbon dioxide supply system according to claim 2, comprising a second pressure gauge measuring the pressure in the second pipe, wherein
   the control means controls the operation of the pump on the basis of the results of the measurements by the thermometer, the first pressure gauge and the second pressure gauge.

* * * * *